United States Patent [19]
Gladic

[11] 3,792,641
[45] Feb. 19, 1974

[54] POWER BOOSTER

[75] Inventor: Radisko S. Gladic, Chicago, Ill.

[73] Assignee: International Harvester Company, Chicago, Ill.

[22] Filed: Apr. 13, 1972

[21] Appl. No.: 243,721

[52] U.S. Cl............................ 91/372, 91/376, 92/168
[51] Int. Cl........................... F15b 9/10, F16j 15/18
[58] Field of Search..... 91/370, 371, 372, 373, 434, 91/376; 92/168, 129, 167

[56] References Cited
UNITED STATES PATENTS

| 86,974 | 2/1869 | Davidson | 92/167 |
| 1,471,820 | 10/1923 | Beam | 92/167 |
| 3,410,179 | 11/1968 | Kytta et al. | 92/167 |
| 2,870,607 | 1/1959 | Voigt | 92/129 |
| 2,779,314 | 1/1957 | Vorech | 91/372 |
| 2,865,335 | 12/1958 | Lewis | 91/372 |
| 3,040,713 | 6/1962 | Stelzer | 91/372 |
| 3,151,530 | 10/1964 | Brown | 91/372 |

*Primary Examiner*—Paul E. Maslousky
*Attorney, Agent, or Firm*—Floyd B. Harman; John A. Schaerli

[57] ABSTRACT

An input piston carrying a double poppet valve which, during actuation, opens a high pressure fluid inlet in the input piston and seals a dump channel in an output poppet valve to form a hydraulic chamber during actuation. Upon deactuation the double poppet valve seals the high pressure fluid inlet channel in the input piston and opens the dump channel.

1 Claim, 3 Drawing Figures

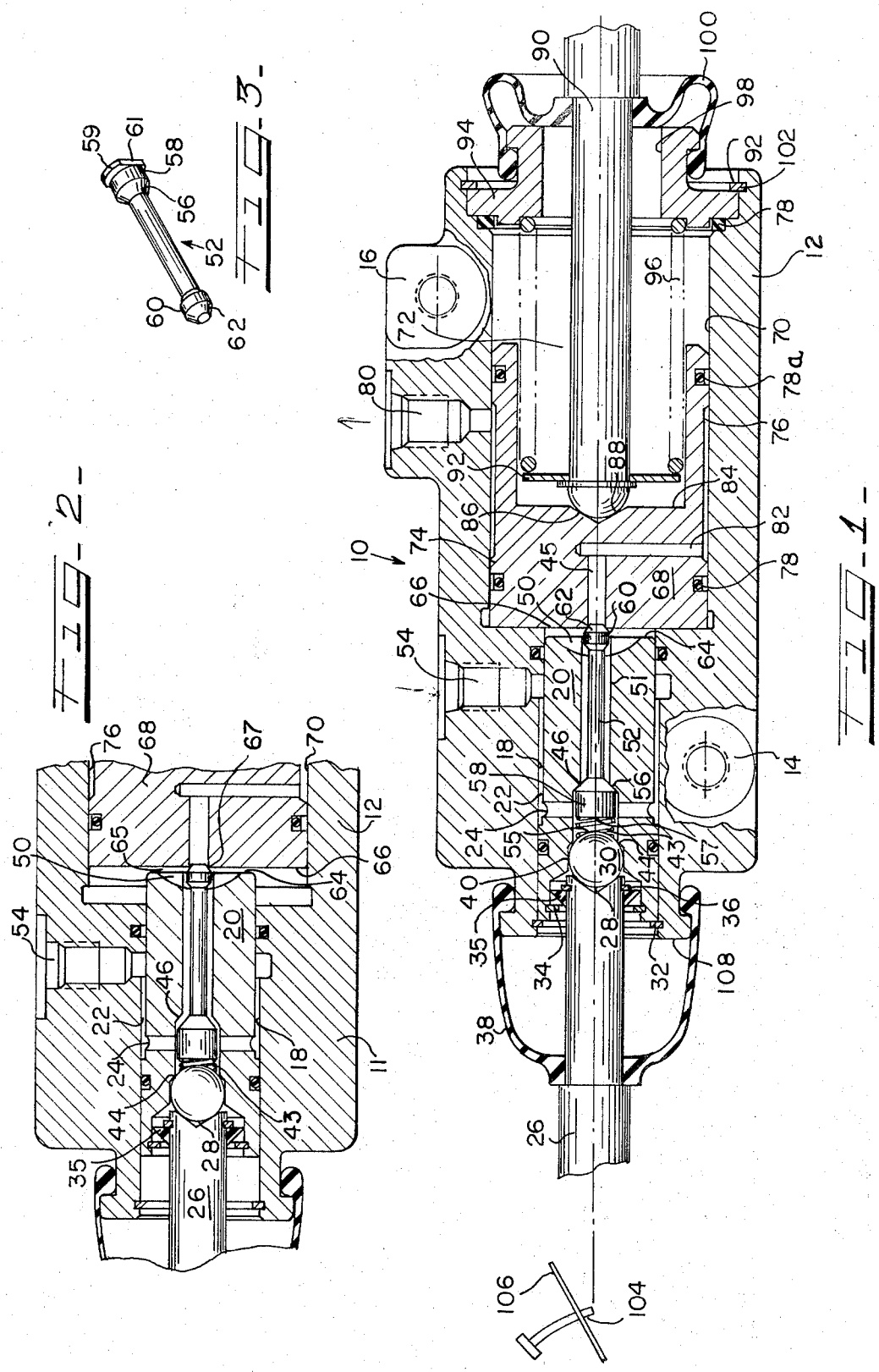

3,792,641

POWER BOOSTER

BACKGROUND OF THE INVENTION

This invention relates to hydraulic booster valves for closed center systems and more particularly, to valves having a mechanically actuated double poppet means which controls the flow from the high pressure inlet as the flow to the dump outlet.

A hydraulic booster unit may be readily used wherever a source of pressurized hydraulic fluid is available. Such units augment the physical forces supplied by the operator to perform a function such as actuation of a braking system, etc. A disadvantage of using a hydraulic booster, however, is that they are for the most part, very complicated, have many moving parts and are expensive.

SUMMARY OF THE INVENTION

In accordance with the invention, a hydraulic booster valve of a closed center type construction for boosting a manual input is disclosed. The valve body has a first and second bore of different diameters, each bore carrying a piston slidably positioned therein. A high pressure fluid inlet port opens into the first bore, passes through a channel in the first piston which extends from the first end thereof to the second end and then into the second piston and from there into an outlet port in the wall of the second bore. The first piston responds to external mechanical pressure exerted thereon while the second piston is subjected to the same mechanical action as well as the force exerted by high pressure hydraulic fluid such that it overcomes the spring forces which tend to maintain it in a neutral position. The channel through which the hydraulic fluid passes has a first seating means located near its first end and a double poppet means floatingly carried therein such that the first poppet seats on said first seat. The second end of the double poppet means extends out from the second end of the first piston such that it can seat in a seating means provided in the channel of said second piston. Upon the exertion of mechanical pressure to the first piston, a hydraulic chamber is formed between the first and second pistons by the seating of the second poppet in the seating means provided in the second piston, such that the mechanical force exerted thereon is multiplied and the components move as the unit to deliver force to an outside force.

It is therefore an object of this invention to provide a hydraulic booster assembly which is inexpensive and not unduly complicated.

Yet another object this invention is to provide a hydrauluc booster assembly which produces "position sense" and "force feel" during articulation.

Still a further object of this invention is to provide a hydraulic booster assembly which functions even upon the failure of hydraulic pressure driving means.

Another object of this invention is to provide a hydraulic booster assembly having a functional indication denoting failure of the hydraulic driving means.

Still another object of this invention is to provide a single double poppet valve for a hydraulic booster assembly which controls the inlet and outlet ports thereof.

Yet another object of this invention is to provide a hydraulic booster assembly having very little dead time or lag.

These and other objects of this invention are achieved by linking a source of pressurized fluid to a hydraulic booster unit.

FIG. 1 is a sectional view showing the hydraulic booster assembly in a released position;

FIG. 2 is a sectional view showing the hydraulic booster assembly in an actuated position; and FIG. 3 is a perspective view of the double poppet valve.

DESCRIPTION OF THE PREFERRED EMBODIMENT

Referring to FIG. 1 of the drawing, numeral 10 designates a closed center type valve comprising input housing means 11, output housing means 12, and mounting bracket means 14 and 16.

Input housing means 11 includes an input bore means 18, an input piston 20 positioned slidingly in said bore and having land means 22 and channel means 24. When it is desired to actuate the input piston 20 to cause movement to the right, force is delivered through pedal means 104, to input shaft means 26, the end 28 thereof abutting ball means 30. Snap ring means 34 and 36 retain said components in said abutting relationship. Further a tapered washer means 35 having a diameter slightly less than bore means 44 allows movement of shaft means end 28 against ball 30. It is thus apparent that this movement is such that the shaft means 26 can be pivoted on ball means 30 without disengagement, snap means 34 simply riding up on tapered washer means 35, thus allowing delivery of force thereto at angles varying slightly from 180°. Additionally, a rubber boot means 38 shields the assembly from external dirt, dust, moisture, etc.

The ball means 30 is positioned in channel means 44 and abuts first shoulder means 40 of input piston means 20 thereby transferring forces from shaft 26 thereto. The channel means 44 extends the entire length of input piston means 20 having a second shoulder means 46 as well as slot means 50. Reciprocatingly carried in channel means 44 is a double poppet valve means 52 which regulates the flow of fluid passing from a pump (not shown) through inlet means 54 and land 22 and channel 24. As is apparent, when the tapered portion 56 of first poppet means 58 abuts shoulder means 46, the corresponding tapered portion 60 of second poppet means 62 extends out from the face 64 of input piston 20. Further, it should be noted that, in a neutral position, a small gap 65 is maintained between face 64 and front face 66 of output piston 68 because input piston 20 is shorter than bore 18. As is apparent, the double poppet valve 52 thus is capable of regulating incoming fluid flow through input piston 20 and outgoing fluid flow through output piston means 68.

The output housing 12 includes an output bore means 70 and an output piston 68 slidingly positioned in said bore. Said output piston 68 having front face portion 66 and bored back portion 72. The outer circumference 74 of said output piston being provided with a land means 76 and seals 78 and 78a. The land means 76 connecting output inlet means 80 and channel means 45 via passage means 82.

The bottom 84 of said bored back portion 72 is provided with a seating means 86, said means accommodating the leading edge 88 of an output shaft means 90. Output shaft 90 is provided with a bracket means 92 which serves in conjunction with the closure means 94 to retain an output return spring means 96 therebetween. The output shaft 90 passes through or journals closure means 94 via aperture 98 and is further provided with a rubber boot means 100 for insulation against dirt, dust, moisture. A snap ring means 102 secures closure means 94 in position. As is apparent, a hydrostatic force output means may be substituted for mechanical output means 90 without deviating from the invention herein disclosed.

Assuming no clutch pedal force is acting on input piston 20, it will be positioned to the left by the return spring means 96 which has acted through output piston 68 to overcome the resistance thereof. The magnitude of the force of the return spring 96 in combination with the area of effective surface 66 are selected such that an ample safety factor is provided to move the assembly to a neutral position once pressure is removed from input shaft 26 via the pedal means 104. It should be understood that other return spring means can be provided, for example, the clutch pedal itself may be fitted with a return spring which urges it and input piston means 20 back into a neutral position, a second suitable return means also being provided for outer piston means 68.

In operation the hydraulic booster unit means 10 is mechanically actuated by the depression of pedal means 104 which is pivotally mounted on the support means 106. Input shaft means 26 pivotally connects the pedal means 104 and extends centrally into the rearward end 108 of the input cylinder 11. Pressurized fluid is introduced through port 54, as shown in FIG. 1, resulting in double poppet means 52 being carried to the right such that shoulder or bevel 56 of input poppet 58 seats against shoulder 46 of input piston 20 cutting off any flow thereof. It should be understood that if valve 10 were in a vertical position with input housing 11 being at the top, gravity would have caused the necessary abutment, such that no fluid would have escaped, however, in the horizontal position, some fluid may escape prior to closing the system. Regardless of which position valve 10 is in, however, input poppet 58 will restrict fluid as soon as the system is pressurized or shortly thereafter. As is apparent, a very weak spring means such as spring means 43 may be provided between face 55 and fact 58 such that double poppet 52 is always urged to the right in a closed position.

As is apparent upon actuation of pedal means 104, forces are transmitted to input piston 20 urging it to the right as shown in FIG. 2. Piston means 20 moves into the space 65 carrying with it double poppet 52 until shoulder means 60 of poppet means 62 seats in abutting relationship with shoulder means 67. Further, movement to the right of piston means 20 results in the opening of the seal between shoulder means 46 and 56 since the double poppet 52 is restrained against further movement by the newly created seal between shoulders 60 and 67. As shown in FIG. 3, back section 59 of poppet 58 is gapped or partially squared at 61 such that an escape means is provided for fluid trapped therebehind.

Thus high pressure fluid is allowed to flow into slots 50 and gap 65 to exert force against the face 66 of output piston 68. Depending on how quickly an abutting relationship between shoulder means 60 and 67 is achieved, some fluid may escape to dump, however, this action simply floats double poppet means 52 forward into the desired abutting relationship. If for some reason output piston means 68 is located too far to the right such that an abutting relationship can be immediately created, double poppet 52 floats forward until shoulder means 46 and 56 seat, avoiding excessive dumping of high pressure fluid. This situation is maintained until a combination of input shaft 26 and the forces exerted by the high pressure fluid moves input piston means 20 sufficiently to the right to achieve the desired seating between should means 60 and 67. This force acts to the right against the return spring 96 creating an abutting seal between shoulders 60 and 67 and forming a power chamber. Since return spring 96 is relatively weak and thus exerts only minimal opposition force.

When the output piston 68 has moved very slightly to the right, its entire face 66 is available to carry the force exerted by the high pressure fluid wave, the advantage therefrom being apparent. After this, piston 20 and output piston 68 move as differential pistons, meaning that the smaller input piston 20 attempts to move faster thereby keeping the fluid outlet seated closed. If the input piston 20 is stopped, the output piston 68 stops when the clearance is such that both first poppet means 58 and a second poppet means 62 are seated, and there is no leak. If a piston leak exists or if poppet 62 unseats fluid would escape to dump and output piston 68 would move back toward input piston 20, thus opening said first poppet means 58 admitting sufficient high pressure fluid to equilibrate the system.

A safety factor inherent in this assembly is that if for some reason the high pressure fluid system should fail, actuation would still be possible by direct application of physical force through the pedal means 104, and input piston 20 to the output piston 68. Further, the substantial increase in physical effort need would alert the operator to the failure of the high pressure system, while still providing a functioning assembly.

Upon release of the driving force on pedal means 104, the roles of the pistons are reversed and output piston 68 through return spring 96 becomes the driving means urging input piston 20 to the left. As input piston moves leftwardly, an abutting seal, between shoulders 46 and first poppet means 58 which was created when the assembly stopped rightward movement is maintained and the seal between shoulders 60 and 67 is broken. Immediately upon breaking this latter seal, high pressure fluid is dumped via channel means 82 and land 76, and dump port 80, creating a low pressure system in front of poppet 58 and a high pressure system behind such that the abutting seal is maintained. Both input piston 20 and output piston 68 thus move leftward under the driving force of return spring means 96 which has been subjected to compression until a released position is achieved.

Because the distance which the input piston must be moved to the right during actuation before the double poppet means 52 opens the fluid input and closes the outlet is minimal dead time or lag is almost nil. That is, almost immediately upon depression of the pedal means, there is a response by the hydraulic booster unit means 10. If the motion starts from any arbitrary position of the system poppet valves are actuated by any small motion from rest and dead time is virtually zero.

An additional feature of this invention resides in the face that the total system employs only a very small volume of hydraulic fluid. Thus, extensive pressurization and pumping equipment is not required.

Although the invention has been described in connection with certain specific embodiments, the principles are susceptible of numerous other applications that will readily occur to those skilled in the art. The invention is, therefore, to be limited only as indicated by the scope of the appended claims.

Having thus described the various features of the invention, what I claim as new and desire to secure by Letters Patent is:

I claim:

1. A closed center hydraulic booster valve functioning with or without high pressure assist comprising:

housing means having chamber means therein and high pressure fluid inlet and outlet means;

input piston and output piston means, each having passage means therein, operately secured in said chamber means whereby a power chamber is formed therebetween, said input piston passage means being connected to said high pressure fluid inlet, and having an inlet valve seat and a double poppet valve means having a first and second end floatingly carried therein, said input passage having means whereby movement of said double poppet means is guided, said first end having a compression spring means whereby it is biased to normally contact said inlet valve seat, said second end extending out from said input passage and having an outlet valve means, said output piston passage means having an outlet valve seat for receiving said outlet valve means whereby when said inlet valve means is seated said outlet valve means is open and when said inlet valve means is open said outlet valve means is closed;

a manual actuated input link means pivotally secured to said input piston means whereby actuating force can be delivered thereto at different degrees of angle;

a ball means carried between said manual actuated input link means and said compression spring, whereby said ball means centers said compression spring and facilitates pivotal movement of said input link means;

fluid energy source means interconnected with said fluid inlet means and a fluid return means interconnected with said outlet means;

an output link means pivotally secured to said housing means; and a spring means continuously urging said input and ouput pistons into a neutral position.

* * * * *